US011465297B2

(12) United States Patent
Buind (10) Patent No.: US 11,465,297 B2
(45) Date of Patent: Oct. 11, 2022

(54) QUICK ROBOT ARM TOOL CHANGER

(71) Applicant: Kjell Buind, Tyristrand (NO)

(72) Inventor: Kjell Buind, Tyristrand (NO)

( * ) Notice: Subject to any disclaimer, the term of this patent is extended or adjusted under 35 U.S.C. 154(b) by 382 days.

(21) Appl. No.: 16/646,040

(22) PCT Filed: Sep. 10, 2018

(86) PCT No.: PCT/NO2018/050226
§ 371 (c)(1),
(2) Date: Mar. 10, 2020

(87) PCT Pub. No.: WO2019/054880
PCT Pub. Date: Mar. 21, 2019

(65) Prior Publication Data
US 2020/0276719 A1  Sep. 3, 2020

(30) Foreign Application Priority Data
Sep. 14, 2017  (NO) .................................. 20171482

(51) Int. Cl.
*G06F 17/00* (2019.01)
*B25J 15/04* (2006.01)
*B25J 11/00* (2006.01)
*B25J 15/00* (2006.01)
*B25J 19/00* (2006.01)
*B25J 9/12* (2006.01)

(52) U.S. Cl.
CPC ....... *B25J 15/0408* (2013.01); *B25J 11/0055* (2013.01); *B25J 15/0019* (2013.01); *B25J 19/0025* (2013.01); *B25J 9/12* (2013.01)

(58) Field of Classification Search
CPC ................ B25J 15/0408; B25J 11/0055; B25J 15/0019; B25J 19/0025; B25J 9/12; B25J 15/0458
USPC ........................................................ 403/376
See application file for complete search history.

(56) References Cited

U.S. PATENT DOCUMENTS

| 2,615,664 | A | | 10/1952 | Reeves |
| 3,021,149 | A | | 2/1962 | Griffin |
| 4,636,135 | A | | 1/1987 | Bancon |
| 4,676,142 | A | | 6/1987 | McCormick et al. |
| 5,044,063 | A | * | 9/1991 | Voellmer ........... B23Q 3/15553 483/902 |

(Continued)

FOREIGN PATENT DOCUMENTS

| DE | 20 2005 009 480 | 9/2005 |
| DE | 20 2016 003 670 | 8/2016 |

(Continued)

OTHER PUBLICATIONS

International Search Report dated Jan. 9, 2019 in corresponding International Application No. PCT/NO2018/050226.

(Continued)

*Primary Examiner* — Ronnie M Mancho
(74) *Attorney, Agent, or Firm* — Wenderoth, Lind & Ponack, L.L.P.

(57) ABSTRACT

The present invention disclose a tool-holder (10) comprising a first part (10a) and a second part (10b), wherein a wedge shaped locking mechanism is arranged partly on a first surface of the first part (10a) operable to be joined with further parts of the wedge shaped locking mechanism arranged on a second surface of the second part (10b).

13 Claims, 3 Drawing Sheets

(56) References Cited

U.S. PATENT DOCUMENTS

| | | | | |
|---|---|---|---|---|
| 5,664,793 | A | * | 9/1997 | Engibarov ........ B23B 31/16279 |
| | | | | 403/381 |
| 5,782,571 | A | * | 7/1998 | Hufford ................... B25J 15/04 |
| | | | | 901/41 |
| 6,182,491 | B1 | * | 2/2001 | Perlman ................ B21D 43/057 |
| | | | | 403/381 |
| 2009/0044655 | A1 | * | 2/2009 | DeLouis ............... B23B 31/113 |
| | | | | 403/24 |
| 2020/0306996 | A1 | * | 10/2020 | Kieffer ................. B25J 15/0408 |

FOREIGN PATENT DOCUMENTS

| | | | | |
|---|---|---|---|---|
| JP | 2010-120140 | | 6/2010 | |
| WO | 2018/111575 | | 6/2018 | |
| WO | WO-2018111575 A1 | * | 6/2018 | ............. A61B 34/30 |
| WO | 2358965 A1 | * | 3/2019 | .......... B25J 15/0408 |
| WO | WO-2019080977 A1 | * | 5/2019 | .......... B25J 15/0416 |

OTHER PUBLICATIONS

Norwegian Search Report dated Apr. 10, 2018 in corresponding Norwegian Application No. 20171482.

* cited by examiner

QUICK ROBOT ARM TOOL CHANGER

FIELD OF THE INVENTION

The present invention is related to a tool-holder attachable in one end to a robot arm, wherein the tool holder is arranged with wedge shaped elements constituting a locking mechanism.

BACKGROUND OF THE INVENTION

Industrial robots are widely used in different industries. Recent developments in computer science, artificial intelligence and sensor technology is opening up new frontiers of robot technology. Some robots are specialized in performing a special autonomous task like painting cars. Others are of a more general type being able to change a variety of tools according to specific needs and applications or specific tasks at respective stages of operations of the robot. A robot system comprises in general terms a computer system running software that configures, manipulates and activates operation of a manipulator that holds different changeable tools. It is common to use an arm with a certain degree of freedom of movement in space that is connected to the manipulator. A manipulator can be an advanced instrument controlling and interacting with tools and sensors attached to the manipulator.

In the context of the present invention, simple and complex manipulators as well as simple tools that can be connected and/or be de-connected to/from a robot arm is described in the following disclosure as a "tool". Further, the connection between a robot arm and the "tool" as defined herein is via a tool-holder providing means for quick locking and/or respective unlocking of tools to/from the robot arm.

A robot may be configured to change tools automatically. For example, respective tools may be located in a tray located beside the robot. The robot arm can be configured to move the robot arm over an empty bin and release the attached tool before moving the robot arm above a next bin comprising a next tool to be used, and attach the next tool to the robot arm and so on.

The movement of robot arms can be harmful to humans if a robot arm by accident hits a person. Therefore, industrial robots are often located inside fences preventing humans to come within reach of a robot arm. The consequence is that humans will not be able to intervene or interact with the operations of the robot other than via for example a connected computer terminal located outside the fence.

The company Universal Robots are for example developing collaborative robots that do not need to be located behind fences. If the robot arm hits a human body or any other obstacle by accident, sensors in the robot arm will detect the incident and the movement of the robot arm stops automatically. The robot can automatically resume work when removing the obstacle(s). In such a working environment, a human can participate or be in a collaborative relation with the robot when for example selecting and changing respective tools, and/or starting or modifying corresponding programs in a computer controlling the robotic actions and movements and the use of respective tools. In this manner, a human operator can interactively intervene with the operations of the robot dependent on respective needs or unforeseen problems encountered during operations, which a human operator is skilled to spot etc. In some instances, this ability may broaden the area of use of industrial robots and/or operational skills of the robot. However, it is further evident that a collaborative robot may be configured to operate in an autonomous modus without interference from humans.

When using robots, accuracy of positioning tools with respect to a work piece for example can be a challenge. There are tolerances in the movements of the robot arm, and in the positioning of the work piece relative to the robot arm, which may need to be extremely accurate if the tolerance requirements of the final work result is high. The same problem may arise with respect to handling tools. The design of a tool-holder needs to be adapted to a part of the tool the tool-holder may grip around and further be able to hold steady during operations of the tool. The strain on the coupling interface between a tool and the tool-holder can vary in different directions dependent on how the robot arm moves the tool. It is also dependent on how the operational connection between the tool and the work piece is functioning. For example, drilling a hole is providing strain mostly in a vertical direction while milling, trimming or cutting operations etc. will provide strains in almost all perpendicular directions and/or any orientations relative to the tool axel. The accuracy of the tool operations may be compromised if the tool is not firmly fixed to the tool-holder and to the robot arm during operations.

In prior art there are examples of tool-holder designs trying to mimic a human hand. The beneficial aspect of an artificial hand is the ability to receive feedback from the hand when for example moving the tool-holder to a position wherein the hand can grip around the tool. The accuracy of positioning the hand does not need to be very accurate since feedback from the hand when gripping the tool will help the robot in guiding the hand into the correct position and final optimal gripping position. However, an artificial hand may not be strong enough to withstand strain induced in the interface between the artificial hand surfaces and the tool. The complexity of an artificial human like hand can be very high, and thereby the cost of making the artificial hand, which makes it difficult to apply the artificial hand in any general applications of a robot. Artificial hands are usually reserved for very special types of use and operations.

A further challenge regarding a tool-holder used in a collaborative robot is that the operation of changing a tool should be possible to be performed by a human as well as by a device or an assembly of devices providing locking and unlocking functionality of the tool-holder being controlled by the robot. This means that a human hand as well as a mechanical and/or electronic device or hydraulic arrangement in the robot or the robot arm itself should be able to execute operations of connecting or releasing a tool to/from the tool-holder.

U.S. Pat. No. 4,636,135 A disclose a tool-holder B for gripping, holding and changing tools of an industrial robot, which is suitable to be fixed to a rotary wrist-joint (5) of a robot arm. The tool-holder B comprises an upstream part C able to be fixed to the wrist-joint (5) of the robot arm, and a downstream part D able to be fixed to a tool. The downstream part D comprises an outwardly protruding arm ending in a ball shaped part, which is inserted into an adapted cylinder shaped part of the upstream part C comprising a device adapted to grip around the ball shaped part. Hydraulic driven actuators may activate the gripping. Stopping or reversing the hydraulic driven actuator may release the gripping. Thereby the tool may be locked or unlocked from the robot arm by activating/deactivating a locking/unlocking device.

It is a challenge regarding collaborative robot tool-holder designs in that the locking and unlocking operations of a tool should be easy and effortless. A human and the force a human hand has to exert on the lock should be effortless while the lock should withstand any wobbling of the attached tool when the tool is used. Further, the firm gripping withstanding wobbling should not be of a magnitude jamming the lock when locked, and thereby making it difficult to unlock, i.e. separating the tool from the robot arm. Therefore, regardless of any type of operations of a robot, the tool-holder should enable effortless locking and unlocking operations, and at the same time be able to grip firmly around the tool preventing any kind of wobbling around the robot arm of the tool held by the tool-holder when locked.

Hand held electric driven tools like drills etc. are used with a plurality of different changeable tools as known in prior art. It is within the scope of the present invention that the same design principles applied for a tool-holder of a robot arm according to the present invention may be used with a hand held drill or any other types of motor driven hand held equipment.

The same design principles applied for a tool-holder of a robot arm according to the present invention may be used in any type of machines wherein replacement of an item with a same item or any one other item among a plurality of different items takes place.

Therefore, there is a need of an improved tool-holder.

OBJECT OF THE INVENTION

It is a further object of the present invention to provide an alternative to the prior art.

In particular, it may be seen as an object of the present invention to provide a tool-holder providing quick and effortless change of tools the tool-holder is holding by an interface between the wo parts of the tool-holder being locked/unlocked by an arrangement of wedge shaped elements arranged in between the two parts.

SUMMARY OF THE INVENTION

An aspect of the present invention is to provide a tool-holder comprising a first part and second part having surfaces that are facing each other, wherein complementary wedge shaped elements on respectively the first part and the second part is configured to be joined and function as a releasable locking mechanism.

Thus, the above described object and several other objects are intended to be obtained in a first aspect of the invention by providing a tool-holder comprising a first part and a second part being connectable and separable via an interface constituted by a first surface on the first part operably facing towards a second surface on the second part,
wherein a wedge shaped element is protruding outwardly from the first surface, and
wherein a wedge shaped indent arranged on the second surface is adapted to receive the protruding wedge shaped element on the first surface when operably joining the first and second surfaces,
a longitudinal length of the protruding element on the first surface is equal to at least one width of the first surface, and an corresponding longitudinal length of the indent on the second surface is adapted to the longitudinal length of the protruding element on the first surface, and the corresponding adapted length on the second surface is further equal to at least one width of the second surface, longitudinal side surfaces of the protruding element on the first surface is inwardly inclined and adapted to correspondingly inwardly inclined longitudinal side surfaces of the indent on the second surface.

Respective aspects of the present invention may each be combined with any of the other aspects. These and other aspects of the invention will be apparent from and elucidated with reference to the embodiments described hereinafter.

DESCRIPTION OF THE FIGURES

The tool-holder according to the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF AN EMBODIMENT

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. The mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Respective operations of a tool controlled via a robot arm will normally require supply of electric power and/or hydraulic fluid and or compressed air etc. as known in prior art to be able to operate the tool. Normally, this is supplied via the robot and the robot arm, wherein programs running (executed) in a computer controlling a robot arm movements can in addition be configured to regulate flow of electricity, hydraulic fluid and compressed air etc. thereby controlling operational aspects of the tool itself.

Figure 3:
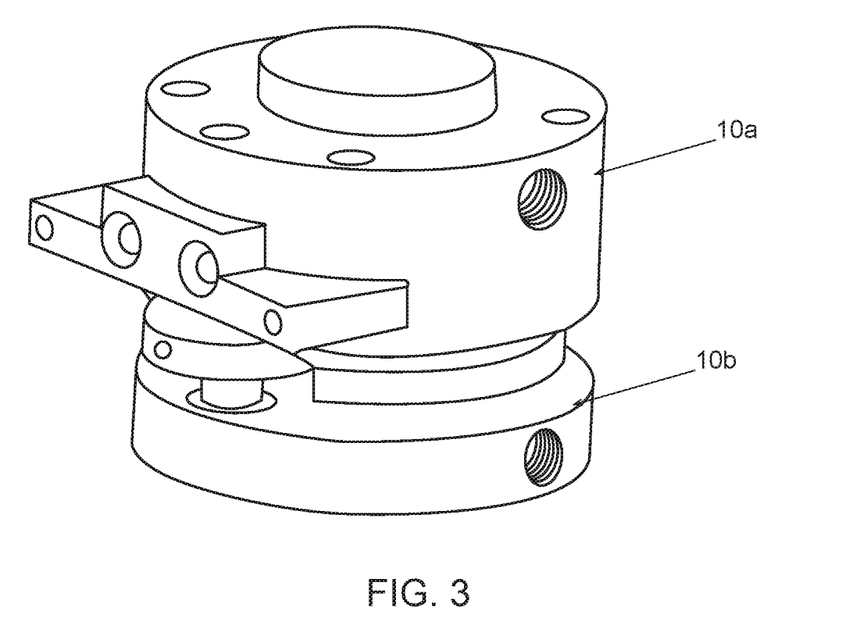
FIG. 3 illustrates an assembly of respective part of an example of embodiment of the present invention.

An example of a tool holder 10 according to the present invention is depicted in FIG. 3 and comprises a first part 10a and a second part 10b being locked together in an interface constituted by a first surface of the first part 10a facing second surface of the second part 10b. The first part 10a may for example be connected to a robot arm while the second part 10b may be attached to a tool, or vice versa.

Figure 2A:
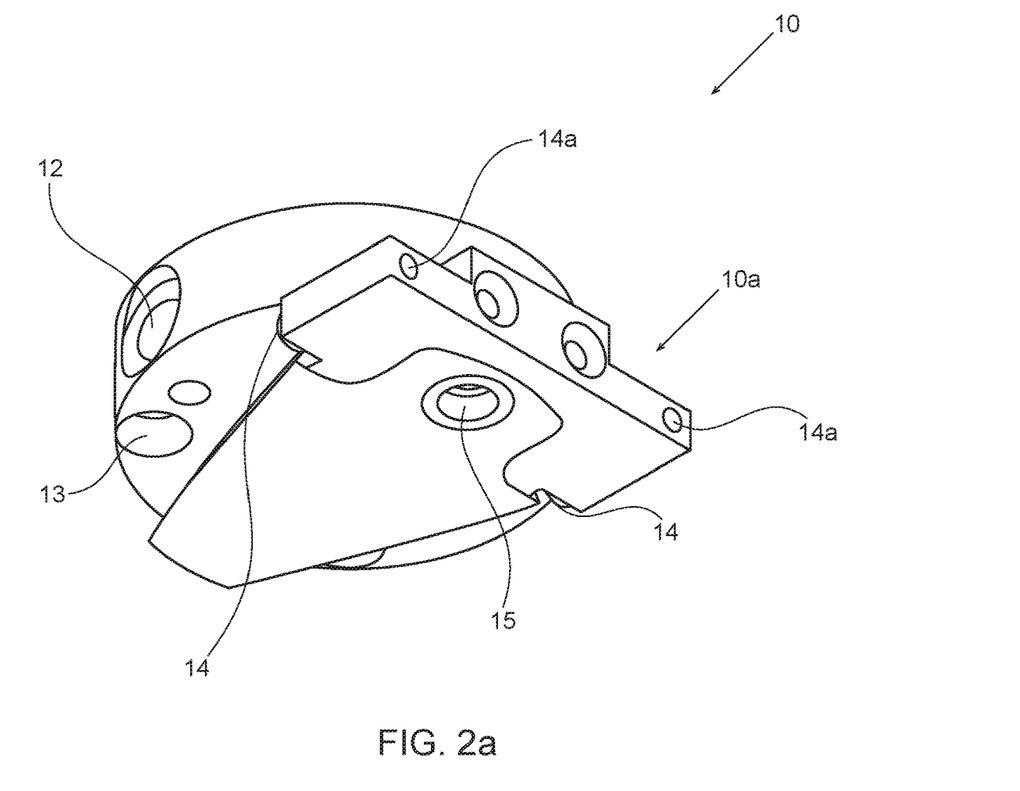
FIG. 2a illustrates a first part of an example of embodiment of the present invention.
Figure 2B:
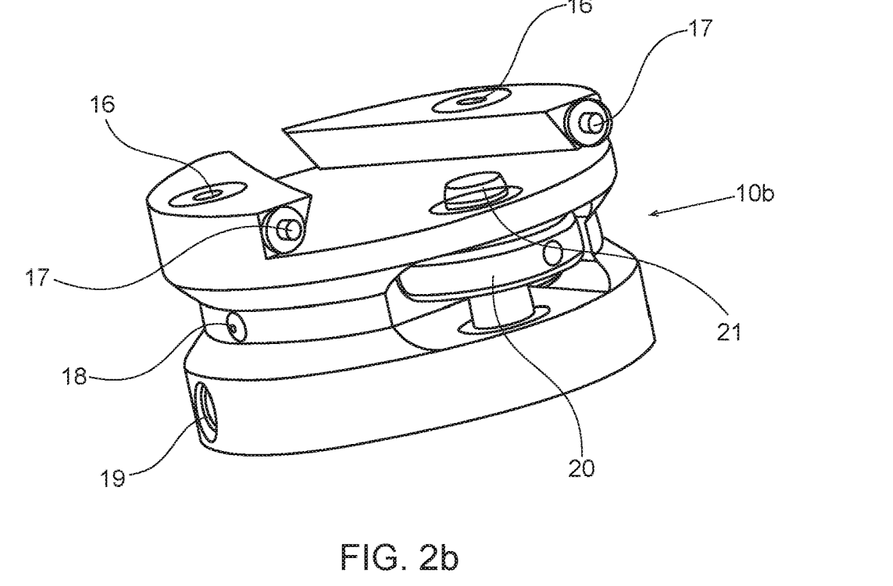
FIG. 2b illustrates a second part of an example of embodiment of the present invention.

FIG. 2a illustrates details of an example of embodiment of the first part 10a, while FIG. 2b illustrates details of an example of embodiment of the second part 10b.

Supply of electricity, hydraulic fluids, compressed air etc, is a way of transferring energy in different forms suitable for different applications of respective tools. Electricity can be used to turn an electric motor around, for example. The amount of delivered electric power can regulate the rotational speed, and/or increase the torque of the electric motor etc. The same apply for other types of energy sources. In the description below, the term "supplied energy" to the tool refer to the non-limiting examples of different types of sources discussed above.

Figure 1:
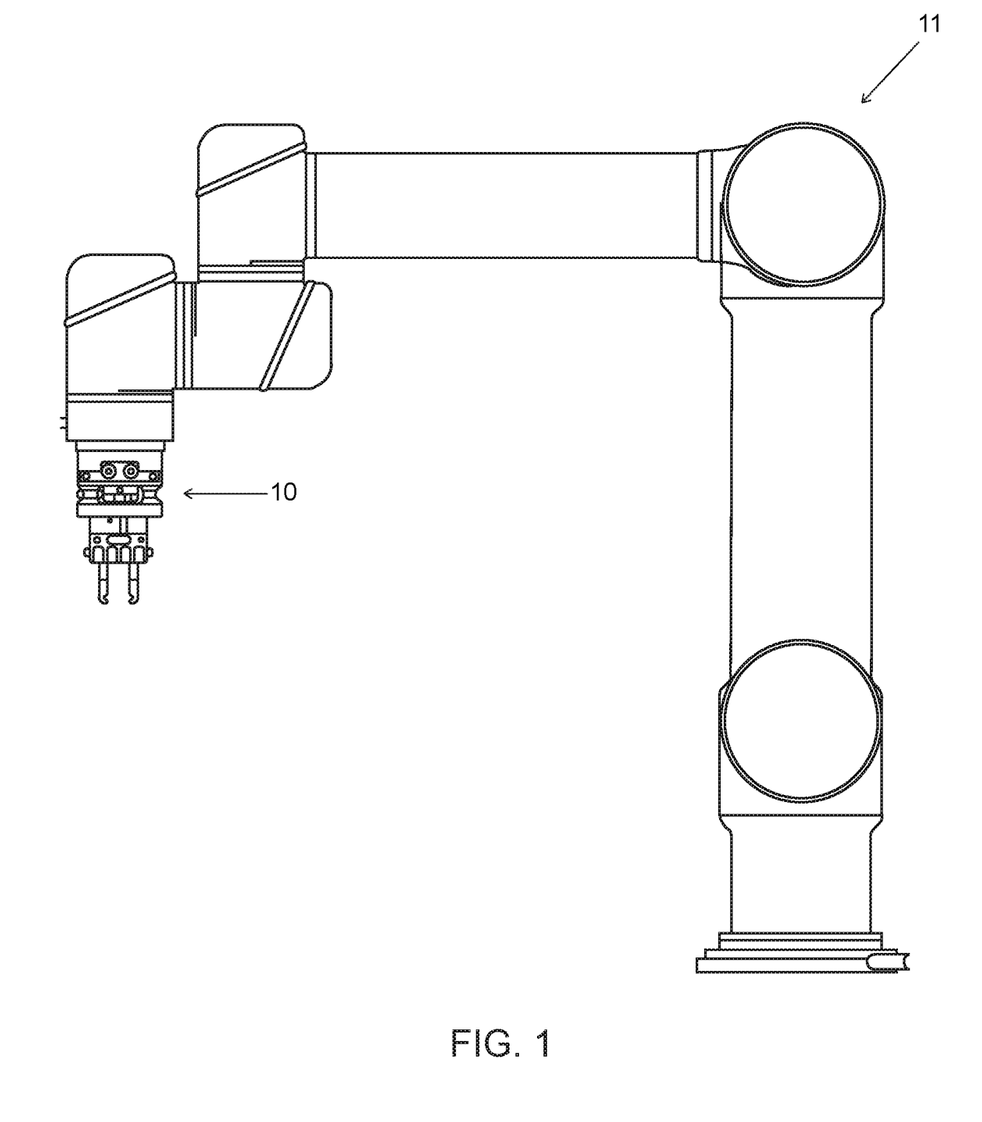
FIG. 1 illustrates an example of embodiment of the present invention.

FIG. 1 illustrates an example of a robot arm 11 comprising a tool-holder 10 according to the present invention. The tool-holder is located in between a distal end of the robot arm and the tool itself.

Any transport of supplied energy may pass via the tool-holder 10 and/or via tubes and/or electric cables (not illustrated) bypassing the tool-holder 10. When a tool is attached to the robot arm via the tool-holder 10, quick locking/unlocking arrangements can make it quick and easy to connect respective tubes and cables etc.

The tool-holder 10 illustrated in FIG. 1 comprises two parts, the first part 10a illustrated in FIG. 2a and the second part 10b illustrated in FIG. 2b. The illustrations in FIGS. 2a and 2b viewed together depict the tool-holder 10 when the first and second part are unlocked from each other and separated. FIG. 3 illustrates a situation wherein the first part 10a and the second part 10b is joined together in a locking position.

With reference to FIG. 2a, the first part 10a is arranged for example with an opening 12 located on a side surface of the body of the first part 10a that can be configured to be an inlet. The inlet 12 may receive fluids like hydraulic fluids or pressurized air, water etc. The inlet 12 may communicate with an outlet 13 on a first surface (for example a bottom surface) of the first part 10a via a channel inside the body of the first part 10a.

With reference to FIG. 2b, the second part 10b is arranged for example with an opening 16 located on a second surface of the body (for example a top surface) of the second part 10b that can be configured to be an inlet. The inlet 16 may receive fluids like hydraulic fluids or pressurized air, water etc. The inlet 16 may communicate with an outlet 19 located on a side surface of the second part 10b via a channel inside the body of the second part 10b.

When joining the two parts 10a and 10b together, as illustrated in FIG. 3, the outlet opening 13 on the first surface of the first part 10a will be oriented above the inlet opening 16 on the second surface of the second part 10b. Thereby an open fluid path is established from the inlet 12 on the side surface of the body of the first part 10a to the outlet opening 19 on the side surface of the body of the second part 10b.

If for example the first part 10a is connected to a robot arm 11, a tubing may be connected from the robot to the inlet 12.

If for example the second part 10b is connected to a tool requiring hydraulic fluid to operate, a tubing can be connected to the outlet 19 and then to the tool connected to the second part 10b.

One reason of configuring the robot to supply for example hydraulic fluid, is that the robot can be configured to control the hydraulic fluid stream from the robot to the tool. Then fluid can be switched on or off, fluid stream velocity can be controlled, and fluid volume can be controlled etc.

With reference to FIG. 2a, openings 14a can be configures to receive electric power signal lines of for example opposite polarity. These lines are guided through the body of the first part 10a to an opposite side wherein electric contacts 14 are arranged.

With reference to FIG. 2b, electric contact pins 17 are located on adapted locations in the body of the second part 10b. The contact pins 17 is connected to electric signal lines inside the body of the second part can be connected to a tool being connected to the second part 10b (not illustrated). When the first and second part 10a and 10b are joined together an electric connection, for example a power connection, is established between the contact point 14a on the first part and a tool connected to the second part 10b.

In the example of embodiment illustrated in FIG. 2a, there is a wedge shaped object or element protruding outwardly from the first surface of the first part 10a along a diagonal of the first surface. There is an adapted complementary wedge shaped inwardly protruding indent or element in (on) the second surface of the second part 10b arranged along a diagonal on the second surface of the second part 10b.

The wedge shaped elements are arranged across the complete diagonal of the first and second surfaces. The wedge shaped elements are also arranged to be cut off in both ends of the wedge shaped arrangements. Thereby there will be a smaller end surface at one end of the protruding wedge shaped object compared to the opposite end of the wedge shaped object having a larger end surface due to the wedge shaped elements. Correspondingly, there will be a narrower opening in one end of the indent and a wider opening in the other end of the wedge shaped indent on the second part 10b.

The side faces in the longitudinal direction of the protruding wedge shaped object on the first surface of the first part 10a are inclined inwardly.

A corresponding arrangement is made with respect to the indent arranged in (on) the second surface on the second part 10b. The side faces of the indent is inclined with a same amount as the side surfaces of object on the first part 10a.

Therefore, when joining the first part 10a and 10b of the tool-holder 10, the wedge shaped object of the first part 10a is inserted with the smaller end surface into the wider side opening of the wedge shaped indent on the second part 10b. When fully inserted, the first part 10a may be centered on top of the second part 10b. The inclined surfaces keeps and holds the two parts connected to each other.

The locking, i.e. that keeps the two parts firmly together is achieved by a spring loaded outwardly protruding locking pin 21 arranged on the side of the wedge shaped indent having the larger opening. When inserting the first part 10a, the protruding object of the first part 10a will come in contact with the locking pin 21 and will push the locking pin inwards, i. e. the spring of the locking pin 21 will be compressed.

When the first part 10a is completely inserted, the locking pin 21 will be located below an adapted hole 15 in the body of the first part 10a. The spring in contact with the locking pin 21 will then push the locking pin upwards into the adapted hole 15. The inclined side surfaces of the wedge shaped elements and the activated locking pin 21 will then keep the first part 10a and the second part 10b firmly together. It follows then that a tool can be attached to a robot arm using the tool-holder 10 according to the present invention.

A technical effect of having inclined side surfaces on the wedge shaped elements is that when the object of the first part 10a is moved inward into the wedge shaped indent, the inclination of the side surfaces of the wedge shaped cooperating elements will force the two elements to move closer to each other. When the object of the first part 10*a* is completely inserted the inclination will make the object of the first part 10*a* to be in complete contact with the bottom surface of the indent.

When unlocking the first part 10*a* from the second part 10*b* of the tool-holder 10, there is illustrated in FIG. 2*b* an example of a cylinder shaped object 20 surrounding the locking pin 21 inside an open cavity on a side surface of the body of the second part 10*b*. The cylinder shaped object 20 is a locking activator. When the locking activator 20 is pulled downwards the locking pin 21 is pulled downwardly out of the adapted opening 15 on the first part 10*b*. Then the first part 10*a* of the tool-holder may be released from the second part 10*b* of the tool-holder by pushing the wedge shaped elements of the tool holder apart from each other. It follows then that a tool can be released from a robot arm when using the tool-holder according to the present invention.

With reference to FIG. 2*b*, there is a failsafe button 18 arranged on a side face of the body of the second part 10*b*. This is a locking pin preventing the locking activator from being activated by accident. For example, if a human hand is activating the locking activator 20, a second hand or a finger needs to push the failsafe button 18 to be able to push the locking activator 20 downwards.

Operating the locking activator 20 and the failsafe button 20 can also be done for example with hydraulic operated arms controlled by the robot. It is also possible to configure another robot to operate the locking activator 20 and the failsafe button 18. Then one robot can assist another robot.

When the protruding wedge shaped object on the first part 10*a* is inside the wedge shaped indent on the second part 10*b*, relative movement along the longitudinal directions of the two wedge shaped elements may move the elements closer to each other inside the wedge shaped form. This may be causing a jamming of the two element thereby it may be difficult, or at least it will require some force, to split the two elements apart from each other when unlocking the tool-holder.

If the application of the tool-holder, i.e. the attached tool is known to be within an environment where forces on the tool-holder is low this problem may not occur.

Figure 4:
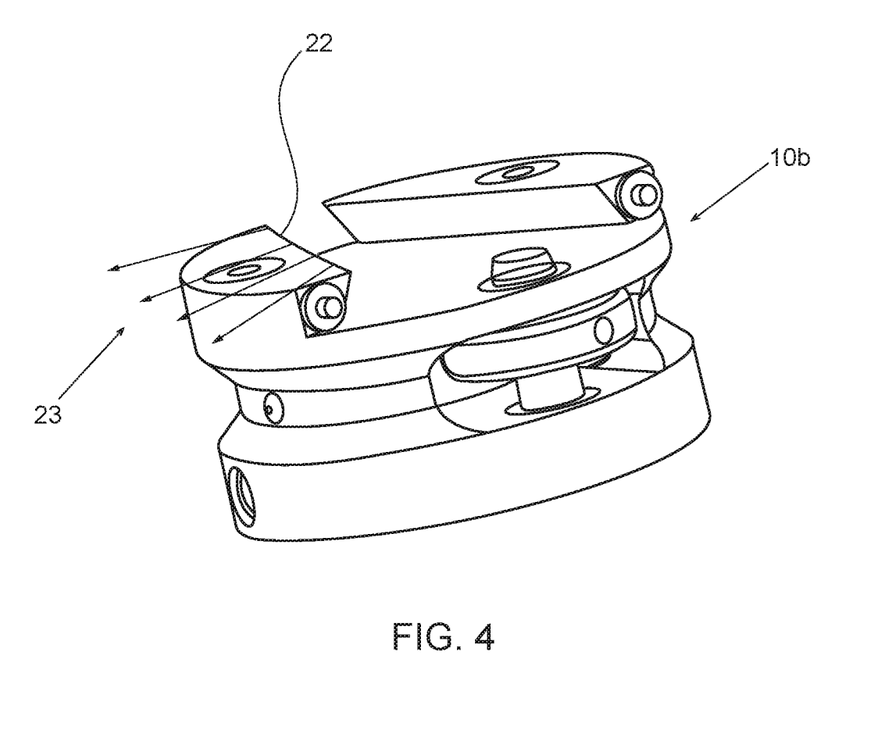
FIG. 4 illustrates further details of an example of embodiment of the present invention.

However, if there is a risk of jamming of the tool-holder, FIG. 4 illustrates an example of embodiment of the tool holder mitigating any possibility of jamming the tool-holder.

FIG. 4 illustrate how the inclined side surfaces (periphery) 22 of the indent on the second surface of the second part 10*b* is arranged with a curvature providing a convex side surface on one side being reversed on the other side along the longitudinal direction of the indent. In FIG. 4 it is illustrated a plurality of vectors 23 being normal to the convex side surface (periphery) 22 of one of the sides of indent. When an object with an adapted curved side surface (periphery) is in complete contact with the side surfaces of the indent, and the object is moving in the plane of the second surface of the second part 10*b*, the movements are stopped by the side surfaces and forces are transferred into the body of the second part 10*b*. The direction of the movement of the object can be in many directions. If the side surfaces (periphery) 22 of the indent is a straight line, the vectors 23 will all be parallel.

When decomposing a force vector acting on the body of the second part 10*b*, for example due to a movement of the object inside the indent, which not in the direction of one of the vectors 23, a component of the force vector will fall parallel along the direction of the side surfaces between the object and the indent. If the curvature of the side faces 22 is a straight line, force component falling along the side surface direction may move the object in or out of wedge shaped indent. If the object moves inwards into the wedge, jamming may occur. Opposite, the force may also act moving the object out of the wedge, which may result in an unstable locking.

If the side face (periphery) 22 is curved, i.e. convex, the decomposition of the vector as discussed above will result in different magnitude of the vector component falling along the direction of the interface between the object and the indent. This is due to the fact that the vectors 23 as illustrated in FIG. 4 will have different directions. A force acting from the object onto the interface, and is acting in the direction of a vector 23 will be taken up completely by the body of the second part 10*b*. If there is an angle between the acting force and the vectors 23, there will be some vectors being more parallel than other vectors with respect to the direction of the acting vector. Therefore, the more parallel vectors indicates that at these parts of the side surface (periphery) 22 will transfer forces to the body of the second part 10*b* in different directions.

A technical effect of having a curved side surface (periphery) 22 of the wedge shaped elements is that the tool-holder will be more stable, i.e. providing less possibility of wobbling of the tool-holder and less possibility of jamming. This is providing a tool-holder design being more effortless to operate by a human hand as well as for autonomous locking/unlocking operations provided by a robot itself or an adjacent located robot, for example.

A further technical effect of the wedge shaped elements is that positioning the first part 10*a* in relation to the second part 10*b* of the tool-holder when connecting a tool needs not to be very accurate. The wider opening of the indent on the second part 10*b* relative to the smaller width or size of the end surface of the protruding object on the first part 10*a* being inserted into the wider opening of the indent requires less precision. Further, the inclined side surfaces of the wedge shaped elements is guiding the first part 10*a* towards the second part 10*b* and therefore the relative height difference between the first part 10*a* and the second part 10*b* at the start of the coupling or joining operations needs less precision.

According to an example of embodiment of the present invention a tool-holder (10) comprises a first part (10*a*) and a second part (10*b*)) being connectable and separable via an interface constituted by a first surface on the first part (10*a*) operably facing towards a second surface on the second part (10*b*), wherein a wedge shaped element is protruding outwardly from the first surface, and wherein a wedge shaped indent arranged on the second surface is adapted to receive the protruding wedge shaped element on the first surface when operably joining the first and second surfaces, a longitudinal length of the protruding element on the first surface is equal to at least one width of the first surface, and an corresponding longitudinal length of the indent on the second surface is adapted to the longitudinal length of the protruding element on the first surface, and the corresponding adapted length on the second surface is further equal to at least one width of the second surface, longitudinal side surfaces of the protruding element on the first surface is inwardly inclined and adapted to correspondingly inwardly inclined longitudinal side surfaces of the indent on the second surface.

Further, the pointed end of the wedge shaped element may be cut, thereby defining a smaller end surface in one end compared to a larger end surface in the opposite end of the cut-off pointed end.

Further, the complementary arranged wedge shaped indent on the second surface of the second part (10*b*) may be cut correspondingly to the cut-off of the wedge shaped object on the first part (10*a*).

Further, the respective side surfaces of the wedge shaped elements may be inclined.

Further, side faces (periphery) 22 of the side faces of the wedge shaped elements may be straight.

Further, side faces (periphery) 22 of the side faces of the wedge shaped elements may be curved.

Further, a spring loaded locking pin (21) may be arranged inside the indent on the second surface.

Further, a locking opening (15) on the wedge shaped element on the first part (10*a*) may be adapted to receive the locking pin (21) when the first part (10*a*) and the second part (10*b*) is joined.

Further, a failsafe button (18) is arranged on a side surface of the body of the second part (10*b*) adapted to prevent un-authorized release of the locking pin (21) from the adapted locking hole (15).

Further, at least one inlet opening (12) may be arranged on a side surface of the body of the first part (10*a*) being in fluid communication with an outlet opening (13) on the first surface of the first part (10*a*).

Further, at least one inlet opening (16) may be arranged on the second surface of the second part (10*b*) being in fluid communication with an outlet opening on a side face of the body of the second part (10*b*), wherein the outlet opening (13) on the first part (10*a*) is in fluid communication with the inlet opening (16) on the second surface of the second part (10*b*) when the first part (10*a*) is joined with the second part (10*b*).

Further, at least one electric connection point (14) on the first part (10*a*) may be electrically connected to a corresponding at least one electric connection point (17) on the second part (10*b*) when the first part (10*a*) is joined with the second part (10*b*).

Further, a computer may be configured to control fluids and/or electric power to an attached tool of the tool-holder.

Further, the tool-holder may be adapted to be connected to a hand held drill.

Further, the tool-holder may be adapted to be connected to a machine in need of replacing an item with a same type of item or any other item among a plurality of different items.

The invention claimed is:

1. A tool-holder comprising a first part and a second part being connectable and separable via an interface constituted by a first surface on the first part operably facing towards a second surface on the second part,
    wherein a wedge shaped element is protruding outwardly from the first surface, and
    wherein a wedge shaped indent arranged on the second surface is adapted to receive the protruding wedge shaped element on the first surface when operably joining the first and second surfaces,
    a longitudinal length of the protruding element on the first surface is equal to at least one width of the first surface, and
    a corresponding longitudinal length of the indent on the second surface is adapted to the longitudinal length of the protruding element on the first surface, and the corresponding adapted length on the second surface is further equal to the at least one width of the second surface,
    longitudinal side surfaces of the protruding element on the first surface is inwardly inclined and adapted to correspondingly inclined longitudinal side surfaces of the indent on the second surface,
    wherein the inclined side surfaces of the protruding element on the first surface on the first part is running along a curved line, and the inclined surfaces of the indent on the second surface on the second part is running along a corresponding curved line.

2. The tool holder according to claim 1, wherein the inclined side surfaces of the protruding element on the first surface on the first part is running along a straight line, and the inclined side surfaces of the indent on the second surface on the second part is running along a corresponding straight line.

3. The tool holder according to claim 1, wherein the wedge shaped indent on the second surface on the second part is arranged with a smaller first opening in a first end of the indent on a side surface of the body of the second part, and
    a wider second opening than the first opening is arranged in an opposite located second end of the wedge shaped indent on the second surface of the second part on a side surface of the second body.

4. The tool holder according to claim 3, wherein the protruding wedge shaped element on the first side of the first part is adapted to the dimensions of the first and respective second openings of the wedge shaped indent on the second surface of the second part.

5. The tool-holder according to claim 4, wherein a spring loaded locking pin is arranged inside the indent on the second surface on the second part in an area being adjacent to the second wider opening of the wedge shaped indent.

6. The tool-holder according to claim 4, wherein a locking opening on the protruding element on the first part is adapted to receive the locking pin when the first part and the second part is joined in a locking position.

7. The tool-holder according to claim 1, wherein a failsafe button is arranged on a side surface of the body of the second part adapted to prevent un-authorized release of the locking pin from the adapted locking hole.

8. The tool-holder according to claim 1, wherein at least one inlet opening is arranged on a side surface of the body of the first part being in fluid communication with an outlet opening on the first surface of the first part.

9. The tool-holder according to claim 1, wherein at least one inlet opening is arranged on the second surface of the second part being in fluid communication with an outlet opening on a side face of the body of the second part,
    wherein the outlet opening on the first part is in fluid communication with the inlet opening on the second surface of the second part when the first part is joined with the second part.

10. The tool-holder according to claim 1, wherein at least one electric connection point on the first part is electrically connected to a corresponding at least one electric connection point on the second part when the first part is joined with the second part in a locking position.

11. The tool-holder according to claim 1, wherein a computer is configured to control fluids and/or electric power to an attached tool of the tool-holder.

12. The tool-holder according to claim 1, wherein the tool-holder is adapted to be connected to a hand held drill.

13. The tool-holder according to claim 1, wherein the tool-holder is adapted to be connectable to a machine in need of replacing items that can be by the tool holder.

\* \* \* \* \*